(12) United States Patent
Nou et al.

(10) Patent No.: US 12,140,105 B2
(45) Date of Patent: *Nov. 12, 2024

(54) MOTORING AN ENGINE AND INJECTING FUEL TO DETERMINE FUEL PROPERTIES BY MEASURING CYLINDER PRESSURE

(71) Applicant: Mazda Motor Corporation, Hiroshima (JP)

(72) Inventors: Yoshihisa Nou, Aki-gun (JP); Fumihiko Saito, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 161 days.

This patent is subject to a terminal disclaimer.

(21) Appl. No.: 17/900,703

(22) Filed: Aug. 31, 2022

(65) Prior Publication Data

US 2023/0077202 A1 Mar. 9, 2023

(30) Foreign Application Priority Data

Sep. 7, 2021 (JP) ................................. 2021-145496

(51) Int. Cl.
*F02D 13/02* (2006.01)
*F02D 35/02* (2006.01)
*F02D 41/00* (2006.01)
*F02D 41/40* (2006.01)

(52) U.S. Cl.
CPC ....... *F02D 41/401* (2013.01); *F02D 13/0234* (2013.01); *F02D 35/023* (2013.01); *F02D 41/009* (2013.01)

(58) Field of Classification Search
CPC .... F02D 35/023; F02D 41/401; F02D 41/009; F02D 13/0234
See application file for complete search history.

(56) References Cited

U.S. PATENT DOCUMENTS 8,010,277 B2 *  8/2011 Ishizuka ............... F02D 41/402
                                               123/198 DB
8,763,582 B2 *  7/2014 Lewis ..................... F02N 11/08
                                               123/179.5
11,143,137 B1 * 10/2021 Kim .................... F02D 13/0234
(Continued)

FOREIGN PATENT DOCUMENTS

JP      2014234727 A      12/2014

*Primary Examiner* — Gonzalo Laguarda
(74) *Attorney, Agent, or Firm* — Alleman Hall & Tuttle LLP

(57) ABSTRACT

A method of controlling an engine is provided, which includes, during motoring of the engine, injecting, by an injector, fuel for analysis into a cylinder of the engine at a specific timing after an intake valve of the cylinder is closed. The method includes acquiring, by a controller, a crank angle period from a start timing of the fuel injection to a timing of a pressure inside the cylinder reaching a reference pressure, in response to signals of a crank angle sensor and an in-cylinder pressure sensor. The method includes determining, by the controller, a property of the fuel injected by the injector by comparing the acquired crank angle period with a reference crank angle period, the reference crank angle period being from an injection start timing when a standard fuel is injected into the cylinder to a timing of the pressure inside the cylinder reaching the reference pressure.

14 Claims, 6 Drawing Sheets

(56) References Cited

U.S. PATENT DOCUMENTS

| | | | |
|---|---|---|---|
| 11,773,804 B2* | 10/2023 | Nou | F02D 41/062 |
| | | | 123/305 |
| 11,891,963 B2* | 2/2024 | Nou | F02D 35/028 |
| 2007/0079647 A1* | 4/2007 | Aoyama | F02D 19/0636 |
| | | | 73/35.02 |

* cited by examiner

MOTORING AN ENGINE AND INJECTING FUEL TO DETERMINE FUEL PROPERTIES BY MEASURING CYLINDER PRESSURE

TECHNICAL FIELD

The present disclosure relates to a method of controlling an engine and an engine system.

BACKGROUND OF THE DISCLOSURE

JP2014-234727A discloses a technique for creating a heat release rate waveform of a low-temperature oxidation reaction, after fuel is injected into a cylinder, by setting a reaction start timing of fuel according to a period during which the fuel floats so as to be on a more advancing side (the lower temperature side of a reaction startable temperature of the low-temperature oxidation reaction) as the floating period is longer. According to this technique, the combustion state can be diagnosed with sufficient accuracy.

Meanwhile, various additives are contained in the fuel supplied to automobile engines, and the type and the combination rate of the additives are different for different manufacturers. Therefore, the properties of the fuel supplied to the automobile engines are not always the same. In some cases, biofuel may be supplied to the engines. The property of the biofuel may be completely different from the property of the fossil fuel. In the future, it is expected that fuel of various properties will be supplied to engines.

On the other hand, a controller of the engine controls the engine by setting beforehand a fuel injection timing and a fuel injection amount which are used for the optimal combustion based on the property of a standard fuel. If the property of fuel supplied to the automobile is different from the standard fuel, it may cause misfire or rapid combustion. Therefore, there is a demand of accurately determining the property of fuel supplied to the engine.

SUMMARY OF THE DISCLOSURE

The technique disclosed herein enables a determination of the property of fuel supplied to an engine with sufficient accuracy.

According to one aspect of the present disclosure, a method of controlling an engine is provided, which includes injecting, during motoring of the engine, by an injector, fuel for analysis into a cylinder of the engine at a specific timing after an intake valve of the cylinder is closed. The method includes acquiring, by a controller, a crank angle period from a start timing of the fuel injection to a timing of a pressure inside the cylinder reaching a reference pressure, in response to signals of a crank angle sensor and an in-cylinder pressure sensor. The method includes determining, by the controller, a property of the fuel injected by the injector by comparing the acquired crank angle period with a reference crank angle period, the reference crank angle period being from an injection start timing when a standard fuel is injected into the cylinder to a timing of the pressure inside the cylinder reaching the reference pressure.

According to this configuration, the injector injects the fuel for analysis into the cylinder during motoring of the engine. Here, "motoring of the engine" refers to a state where a crankshaft of the engine starts rotation by a drive source outside of the engine, such as a generator, an electric motor, or a starter motor. The motoring of the engine corresponds to a startup of the engine. The startup of the engine corresponds to, in the case of engine vehicles, when an ignition switch of an automobile being turned on by a person onboard, or, in the case of hybrid vehicles, when an engine is started for, for example, a demand of generating power, and satisfying a demand torque.

During motoring of the engine, intake stroke, compression stroke, expansion stroke, and exhaust stroke are performed inside the cylinder, by an external driving force. The injector injects the fuel for analysis into the cylinder at the specific timing during compression stroke after the intake valve is closed. The "fuel for analysis" may be a small amount of fuel with which a high-temperature oxidation reaction does not occur even when a piston reaches a compression top dead center. The "fuel for analysis" is fuel to be supplied into the cylinder in order to determine the property of the fuel.

The pressure inside the cylinder gradually rises accompanied by the progress of compression stroke. The fuel injected into the cylinder results in a low-temperature oxidation reaction, through fission, atomization, evaporation, and mixing with air, according to the progress of time. When the molecular arrangement and/or the intermolecular force differ depending on the property of fuel (for example, the chemical structure of fuel), the chemical reaction speed also differs. That is, the speed of the initial chemical reaction in a preparatory step (for example, an in-cylinder gas temperature is 700K) of the low-temperature oxidation reaction differs depending on the chemical structure. The initial chemical reaction is a chemical reaction from occurrence of cold flame by a radical (alkylperoxy RO2, QOOHO2) generation due to a hydrogen abstraction reaction until chemical species, such as H, OH radical, bicarbonate (HCO), hydrogen peroxide ($H_2O_2$) and formaldehyde (HCHO), are generated by the progress of the low-temperature oxidation reaction. If the speed of the initial chemical reaction differs, speeds of increases in the temperature and pressure inside the cylinder differ. The difference in the chemical reaction speed changes the crank angle period from the start of fuel injection into the cylinder to the timing of the pressure inside the cylinder reaching the reference pressure.

The controller acquires the crank angle period from the start timing of the fuel injection until the pressure inside the cylinder reaching the reference pressure, in response to the signals of the crank angle sensor and the in-cylinder pressure sensor. If the fuel injected from the injector is fuel which is quicker in chemical reaction speed, the crank angle period is relatively shorter. On the other hand, if it is fuel which is slower in chemical reaction speed, the crank angle period is relatively longer.

The controller stores the reference crank angle period in advance. The "standard fuel" is, for example, fuel corresponding to K2202 (Motor Gasoline) or K2204 (Diesel Fuel) defined by Japanese Industrial Standards (JIS). The reference crank angle period is the crank angle period from the start timing of the fuel injection until the pressure inside the cylinder reaching the reference pressure, when the standard fuel is injected into the cylinder. Further, the controller compares the acquired crank angle period with the reference crank angle period.

In detail, when the acquired crank angle period is shorter than the reference crank angle period, the fuel injected from the injector is fuel with which the chemical reaction speed is quick, the ignition delay time is short, and the low-temperature oxidation reaction ends early. Therefore, this type of fuel will easily cause the high-temperature oxidation reaction under the engine operation after the startup is finished (that is, when the engine operates by the fuel injected into the cylinder being combusted, unlike the motoring). In this case, the combustion tends to be rapid and combustion noise tends to increase.

On the other hand, when the acquired crank angle period is longer than the reference crank angle period, the fuel injected from the injector is fuel with which the chemical reaction speed is slow, the ignition delay time is long, and the low-temperature oxidation reaction is slow. Therefore, this type of fuel does not easily cause the high-temperature oxidation reaction under the engine operation after the startup is finished, and as a result, the combustion may be slow. This may lead to a reduction in engine torque and the degradation of fuel efficiency.

This technique is made by focusing on the idea that the chemical reaction speed varies depending on fuel. The controller compares the crank angle period from the start timing of the fuel injection until reaching the reference pressure, based on the fact that the crank angle period until the inside of the cylinder rises to the reference pressure varies depending on the chemical reaction speed of the fuel injected into the cylinder. The controller can determine the property of fuel supplied to the engine with sufficient accuracy.

Notably, the determination of the fuel property is performed during motoring of the engine. Since the high-temperature oxidation reaction of fuel does not occur under these circumstances, the controller can determine the fuel property without being influenced by heat or residual gas. Thus, the controller can determine more accurately the property of fuel supplied to the engine.

The cylinder may be on of a plurality of cylinders, and the cylinder into which the injector injects the fuel for analysis may be the cylinder, out of the plurality of cylinders, whose intake valve is closed first after a crankshaft of the engine starts rotation.

According to this configuration, the controller can determine the fuel property without being influenced by heat or residual gas. Further, the rotation speed of the crankshaft gradually increases accompanied by the progress of the engine cycle, and accordingly, the in-cylinder temperature gradually increases. When the in-cylinder temperature increases, the determination of the fuel property may be influenced by heat.

According to this configuration, since the determination of the fuel property is performed inside the cylinder whose intake valve is closed first after the crankshaft of the engine starts rotation, the determination accuracy improves.

The injector may inject the fuel for analysis into each of the plurality of cylinders as a cycle of the engine progresses. The controller may acquire the crank angle period for each of the plurality of cylinders. The controller may compare an average value of the plurality of crank angle periods with the reference crank angle period to determine the property.

According to this configuration, the determination accuracy improves by the controller using the average value of the plurality of crank angle periods to determine the fuel property.

The reference pressure may become lower as the cycle of the engine progresses.

As described above, the in-cylinder temperature gradually increases accompanied by the progress of the engine cycle. The temperature increase inside the cylinder makes the fuel injected into the cylinder more reactive, which promotes the increase in the pressure inside the cylinder. By the reference pressure becoming lower as the cycle progresses, the crank angle period can be measured while eliminating the influence of the temperature increase in each of the plurality of cycles. Thus, the controller can further accurately determine the fuel property based on the plurality of crank angle periods.

The reference pressure may correspond to a pressure inside the cylinder at a timing of the fuel injected into the cylinder from the injector achieving a low-temperature oxidation reaction through fission, atomization, evaporation, and mixing with air.

As described above, this technique is for determining the fuel property by making use of the fact that the speed of the initial chemical reaction varies. By corresponding the reference pressure inside the cylinder with the pressure inside the cylinder when the fuel reaches the low-temperature oxidation reaction through fission, atomization, evaporation, and mixing with air, the in-cylinder pressure sensor and the crank angle sensor can measure the crank angle period to which the initial chemical reaction speed is reflected. The controller can determine the fuel property with sufficient accuracy using the crank angle period. Note that the reference pressure may be set as a pressure lower than a top dead center pressure when the piston inside the cylinder reaches a compression top dead center.

The controller may correct at least one of a fuel injection amount, a fuel injection timing, and a close timing of the intake valve according to the property of the fuel, after startup of the engine is finished.

When the fuel injected from the injector is quicker in the chemical reaction speed, the high-temperature oxidation reaction occurs more easily, which may cause the rapid combustion. When the fuel injected from the injector is slower in the chemical reaction speed, the high-temperature oxidation reaction occurs less easily, which may cause the slow combustion.

By the controller correcting at least one of the fuel injection amount, the fuel injection timing, and the close timing of the intake valve according to the fuel property, the combustion is regarded to be standardized regardless of the fuel property. That is, it can make the combustion equivalent to the combustion with the standard fuel regardless of the fuel property. It becomes advantageous for the improvement in fuel efficiency of the engine and the improvement in emission gas performance. Further, the increase in combustion noise can be suppressed.

When the acquired crank angle period is longer than the reference crank angle period, the controller may correct the close timing of the intake valve to an advancing side, and when the acquired crank angle period is shorter than the reference crank angle period, the controller may correct the close timing of the intake valve to a retarding side.

When the acquired crank angle period is longer than the reference crank angle period, the fuel is relatively slow in the chemical reaction speed. Then, the close timing of the intake valve is corrected to the advancing side. When the close timing of the intake valve is advanced, the temperature and the pressure inside the cylinder increase, which stimulates the chemical reaction of the fuel. Even if the fuel is slower in the chemical reaction speed, this combustion becomes equivalent to the combustion with the standard fuel. Note that the close timing of the intake valve is set to after an intake top dead center. On the contrary, when the acquired crank angle period is shorter than that of the standard fuel, the fuel is relatively quicker in the chemical reaction speed. Then, the close timing of the intake valve is corrected to the retarding side. When the close timing of the intake valve is retarded, the temperature and the pressure inside the cylinder decrease, which results in the slow chemical reaction of the fuel. Even if the fuel is quicker in the chemical reaction speed, this combustion becomes equivalent to the combustion with the standard fuel.

The controller may correct the close timing of the intake valve so that the close timing of the intake valve is advanced when the acquired crank angle period is longer than the reference crank angle period, and when the acquired crank angle period is longer than the reference crank angle period by a given value or more, the controller may increase the fuel injection amount by correcting the start timing of the fuel injection to the advancing side and correcting an end timing of the fuel injection to the retarding side.

According to this configuration, by correcting the close timing of the intake valve to be advanced as the acquired crank angle period is longer than that of the standard fuel, the temperature and the pressure inside the cylinder are adjusted according to the fuel property (that is, the temperature and the pressure inside the cylinder increase). However, there is a limit for the temperature increase inside the cylinder resulting from advancing the close timing of the intake valve. Thus, when the acquired crank angle period is longer than that of the standard fuel by the given value or more, the controller increases the fuel injection amount by correcting the start timing of the fuel injection to the advancing side and correcting the end timing of the fuel injection to the retarding side. Thus, since the concentration of fuel inside the cylinder increases, the chemical reaction is stimulated and the combustion becomes equivalent to the combustion with the standard fuel.

The controller may reduce the fuel injection amount by correcting the close timing of the intake valve so that the close timing of the intake valve is retarded when the acquired crank angle period is shorter than the reference crank angle period.

According to this configuration, by correcting the close timing of the intake valve to be retarded when the acquired crank angle period is shorter than that of the standard fuel, the temperature and the pressure inside the cylinder are adjusted according to the fuel property (that is, the temperature and the pressure inside the cylinder decrease). Further, by decreasing the fuel injection amount, the chemical reaction speed of the fuel is reduced. As a result, the combustion becomes equivalent to the combustion with the standard fuel.

When the valve close timing reaches a maximum retard amount, the controller may reduce the fuel injection amount by correcting the fuel injection start timing to the retarding side and correcting the end timing of the fuel injection to the retarding side when the acquired crank angle period is shorter than the reference crank angle period.

If the close timing of the intake valve is set to a given timing or later (for example, ABDC 90 deg or later), since a blow back to the intake system is limited by the intake valve choke, the temperature and the pressure inside the cylinder at the start timing of the fuel injection do not drop greatly. Thus, when the close timing of the intake valve reaches the maximum retard amount, the controller reduces the fuel injection amount by correcting the start timing of the fuel injection to the retarding side and correcting the end timing of the fuel injection to the retarding side. Therefore, the concentration of the fuel inside the cylinder becomes lower, and thus, the chemical reaction speed becomes slow, and the combustion becomes equivalent to the combustion with the standard fuel.

According to another aspect of the present disclosure, an engine system including an engine is provided, which includes a controller that stores information regarding a property of a standard fuel, an injector that injects fuel into a cylinder of the engine in response to a control signal of the controller, an in-cylinder pressure sensor that is attached to the engine, and outputs to the controller a pressure signal corresponding to a pressure inside the cylinder, and a crank angle sensor that is attached to the engine, and outputs to the controller a crank angle signal corresponding to a crank angle of the engine. During motoring of the engine, the controller causes the injector to inject fuel for analysis at a specific timing after an intake valve of the cylinder is closed. The controller acquires a crank angle period from the start timing of the fuel injection to a timing of the pressure inside the cylinder reaching a reference pressure based on the crank angle signal of the crank angle sensor and the pressure signal of the in-cylinder pressure sensor. The information stored in the controller includes a reference crank angle period from the injection start timing when the standard fuel is injected into the cylinder to a timing of the pressure inside the cylinder reaching the reference pressure. The controller determines a property of the fuel injected by the injector based on a comparison of the acquired crank angle period with the reference crank angle period.

According to this configuration, the controller can determine the property of fuel supplied to the engine, with sufficient accuracy, during motoring of the engine.

DETAILED DESCRIPTION OF THE DISCLOSURE

Hereinafter, one embodiment of a method of controlling an engine and an engine system is described with reference to the accompanying drawings. The controlling method and the engine system which are described herein are merely illustration.

Figure 1:
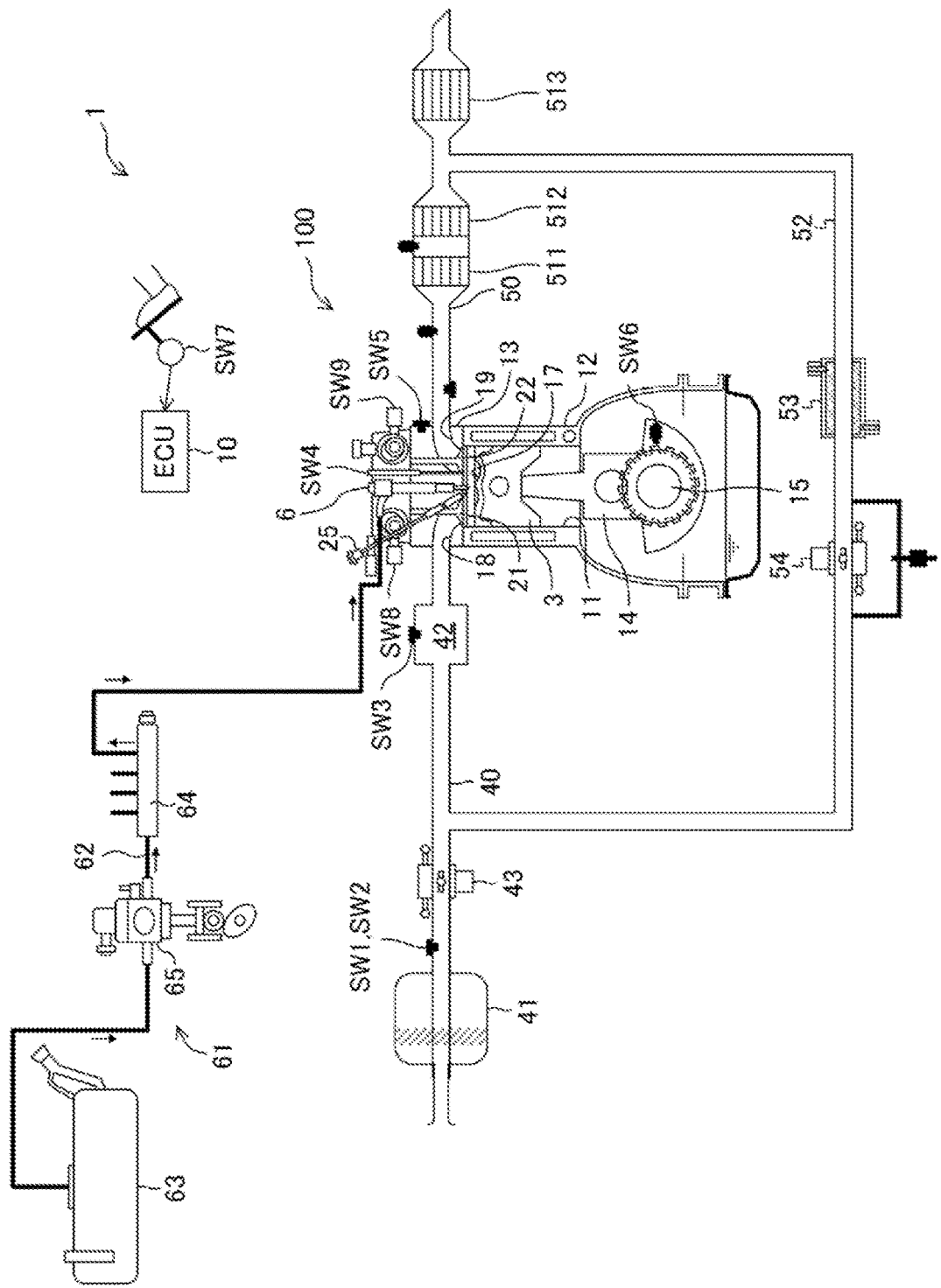
FIG. 1 illustrates an engine system.
Figure 2:
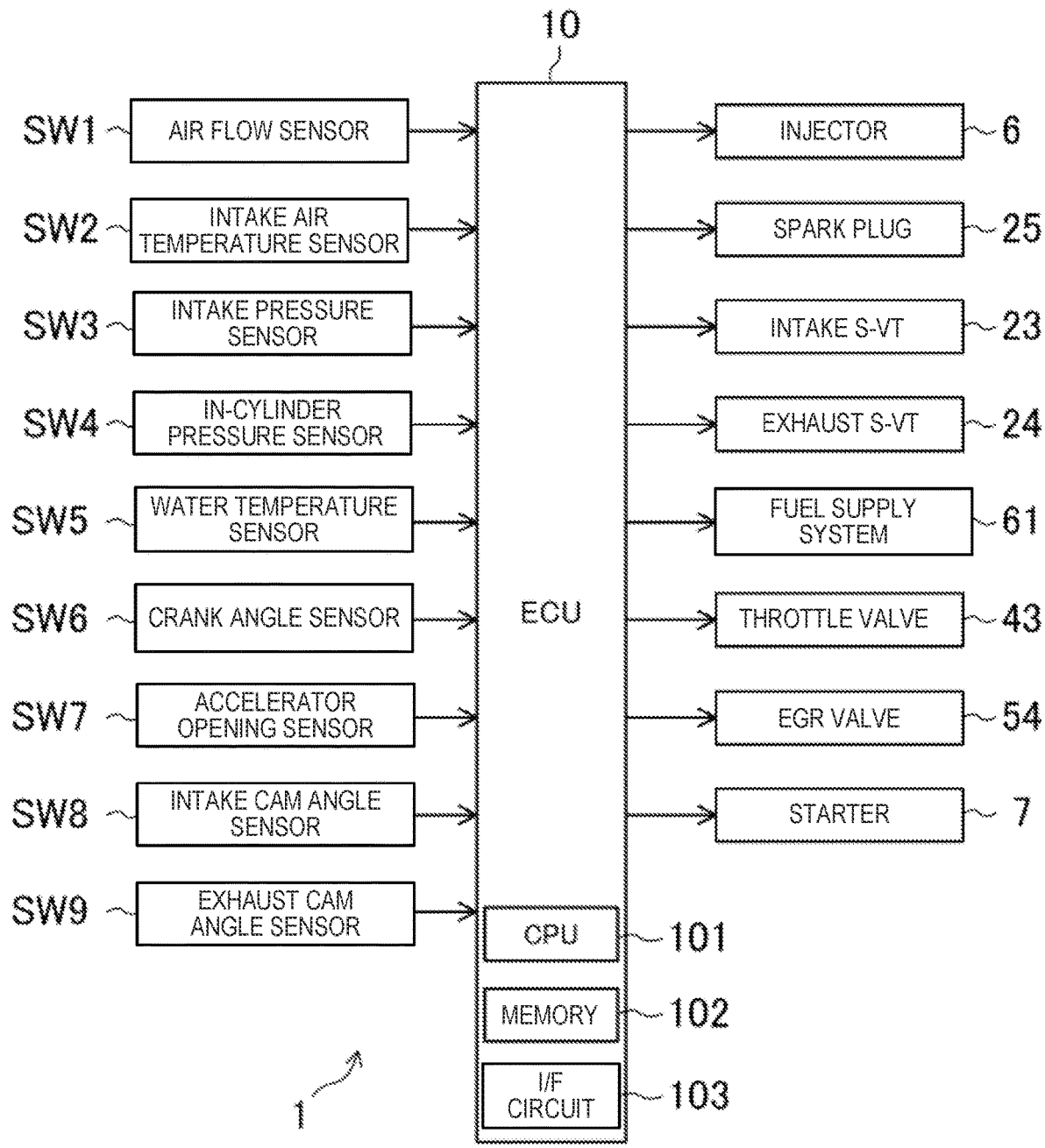
FIG. 2 illustrates the engine system.

FIG. 1 is a view illustrating an engine system 1. The engine system 1 is mounted on a four-wheeled automobile. The engine system 1 includes an engine 100 and a controller which controls the engine 100. The controller is an ECU (Engine Control Unit) 10 which will be described later. FIG. 2 is a block diagram illustrating a configuration related to the control of the engine system 1.

The engine 100 has a cylinder 11. Inside the cylinder 11, intake stroke, compression stroke, expansion stroke, and exhaust stroke are repeated. The engine 100 is a four-stroke engine. The automobile is propelled by the engine 100 in operation. Fuel of the engine 100 is gasoline in this example configuration. The engine 100 may be configured so that a mixture gas combusts by self-ignition in at least a part of the operating range. Note that the fuel of the engine 100 may be diesel fuel.

(Configuration of Engine)

The engine 100 includes a cylinder block 12 and a cylinder head 13. A plurality of cylinders 11 are formed in the cylinder block 12. The engine 100 is a multi-cylinder engine. In FIG. 1, only one cylinder 11 is illustrated.

A piston 3 is inserted in each cylinder 11. The piston 3 is coupled to a crankshaft 15 via a connecting rod 14. The piston 3, the cylinder 11, and the cylinder head 13 form a combustion chamber 17.

The geometric compression ratio of the engine system 1 is set to a high value for the purpose of improvement in theoretical thermal efficiency. In detail, the geometric compression ratio $\varepsilon$ of the engine system 1 is 14.0:1.0 or higher. The geometric compression ratio may be 18:1, for example. The geometric compression ratio may be set suitably within a range of 14:1 or higher and 20:1 or lower.

An intake port 18 is formed in the cylinder head 13 for every cylinder 11. The intake port 18 communicates with the inside of the cylinder 11.

An intake valve 21 is disposed at the intake port 18, and opens and closes the intake port 18. The intake valve 21 is a poppet valve. A valve operating mechanism has an intake cam shaft, and is mechanically connected to the intake valves 21. The valve operating mechanism opens and closes the intake valves 21 at a given timing. The valve operating mechanism is a variable valve operating mechanism which varies a valve timing and/or a valve lift. As illustrated in FIG. 2, the valve operating mechanism has an intake S-VT (Sequential-Valve Timing) 23. The intake S-VT 23 continuously changes a rotation phase of the intake cam shaft with respect to the crankshaft 15 within a given angle range. A valve opening period of the intake valve 21 does not change. The intake S-VT 23 is a variable phase mechanism. The intake S-VT 23 is of an electric or hydraulic type.

An exhaust port 19 is formed in the cylinder head 13 for every cylinder 11. The exhaust port 19 communicates with the inside of the cylinder 11.

An exhaust valve 22 is disposed at the exhaust port 19, and opens and closes the exhaust port 19. The exhaust valve 22 is a poppet valve. The valve operating mechanism has an exhaust cam shaft and is mechanically connected to the exhaust valves 22. The valve operating mechanism opens and closes the exhaust valves 22 at a given timing. The valve operating mechanism is a variable valve operating mechanism which varies a valve timing and/or a valve lift. As illustrated in FIG. 2, the valve operating mechanism has an exhaust S-VT 24. The exhaust S-VT 24 continuously changes a rotation phase of the exhaust cam shaft with respect to the crankshaft 15 within a given angle range. A valve opening period of the exhaust valve 22 does not change. The exhaust S-VT 24 is a variable phase mechanism. The exhaust S-VT 24 is of an electric or hydraulic type.

An injector 6 is attached to the cylinder head 13 for every cylinder 11. The injector 6 directly injects fuel into the cylinder 11.

A fuel supply system 61 is connected to the injector 6. The fuel supply system 61 includes a fuel tank 63 which stores the fuel, and a fuel supply line 62 which connects the fuel tank 63 to the injector 6. A fuel pump 65 and a common rail 64 are provided in the fuel supply line 62. The fuel pump 65 pumps the fuel to the common rail 64. The common rail 64 stores the fuel pumped from the fuel pump 65, at a high fuel pressure. When a valve of the injector 6 opens, the fuel stored in the common rail 64 is injected into the cylinder 11 from a nozzle hole of the injector 6. Note that the configuration of the fuel supply system 61 is not limited to the configuration described above.

A spark plug 25 is attached to the cylinder head 13 for every cylinder 11. The spark plug 25 forcibly ignites the mixture gas inside the cylinder 11.

An intake passage 40 is connected to one side surface of the engine 100. The intake passage 40 communicates with the intake port 18 of each cylinder 11. Air introduced into the cylinder 11 flows through the intake passage 40. An air cleaner 41 which filters the air is disposed at an upstream end part of the intake passage 40. A surge tank 42 is disposed near a downstream end of the intake passage 40. The intake passage 40 downstream of the surge tank 42 constitutes independent intake passages which are branched for every cylinder 11. Downstream ends of the independent intake passages are connected to the intake ports 18 of the respective cylinders 11.

A throttle valve 43 is disposed in the intake passage 40, between the air cleaner 41 and the surge tank 42. The throttle valve 43 adjusts an amount of air introduced into the cylinder 11 by being adjusted an opening of its valve.

An exhaust passage 50 is connected to the other side surface of the engine 100. The exhaust passage 50 communicates with the exhaust port 19 of each cylinder 11. The exhaust passage 50 is a passage through which exhaust gas discharged from the cylinder 11 flows. Although the detailed illustration is omitted, an upstream part of the exhaust passage 50 constitutes independent exhaust passages which are branched for every cylinder 11. Upstream ends of the independent exhaust passages are connected to the exhaust ports 19 of the respective cylinders 11.

An exhaust emission control system having a plurality of catalytic converters is disposed in the exhaust passage 50. The upstream catalytic converter has a three-way catalyst 511 and a GPF (Gasoline Particulate Filter) 512, for example. The downstream catalytic converter has a three-way catalyst 513. Note that the exhaust emission control system is not limited to the illustrated configuration. For example, the GPF may be omitted. Further, the catalytic converter is not limited to what has the three-way catalyst. Moreover, the disposed order of the three-way catalysts and the GPF may be changed suitably.

An exhaust gas recirculation (EGR) passage 52 is connected between the intake passage 40 and the exhaust passage 50. The EGR passage 52 is a passage for recirculating a part of exhaust gas to the intake passage 40. An upstream end of the EGR passage 52 is connected between the upstream catalytic converter and the downstream catalytic converter in the exhaust passage 50. A downstream end of the EGR passage 52 is connected between the throttle valve 43 and the surge tank 42 in the intake passage 40.

A water-cooled EGR cooler 53 is disposed in the EGR passage 52. The EGR cooler 53 cools exhaust gas. An EGR valve 54 is also disposed in the EGR passage 52. The EGR valve 54 adjusts a flow rate of exhaust gas which flows through the EGR passage 52. By adjusting the opening of the EGR valve 54, a recirculating amount of external EGR gas can be adjusted.

As illustrated in FIG. 2, the engine system 1 is provided with the ECU (Engine Control Unit) 10 for operating the engine 100. The ECU 10 is a controller based on a well-known microcomputer. The ECU 10 includes a CPU (Central Processing Unit) 101 which executes a program, memory 102 which is comprised of, for example, RAM (Random Access Memory) and ROM (Read Only Memory) and stores the program and data, and an input and output (I/F) circuit 103 which inputs/outputs an electric signal. The ECU 10 is one example of a controller in the present disclosure.

As illustrated in FIGS. 1 and 2, the ECU 10 is connected to various kinds of sensors SW1-SW9. The sensors SW1-SW9 output signals to the ECU 10. The sensors include the following sensors:

Air flow sensor SW1: Disposed in the intake passage 40, downstream of the air cleaner 41, and measuring a flow rate of air which flows through the intake passage 40;

Intake air temperature sensor SW2: Disposed in the intake passage 40, downstream of the air cleaner 41, and measuring the temperature of air which flows through the intake passage 40;

Intake pressure sensor SW3: Attached to the surge tank 42, and measuring the pressure of air introduced into the cylinder 11;

In-cylinder pressure sensor SW4: Attached to the cylinder head 13 corresponding to each cylinder 11, and measuring the pressure inside each cylinder 11;

Water temperature sensor SW5: Attached to the engine 100, and measuring the temperature of coolant;

Crank angle sensor SW6: Attached to the engine 100, and measuring a rotation angle of the crankshaft 15;

Accelerator opening sensor SW7: Attached to an accelerator pedal mechanism, and measuring an accelerator opening corresponding to an operating amount of the accelerator pedal; Intake cam angle sensor SW8: Attached to the engine 100, and measuring a rotation angle of the intake cam shaft; and Exhaust cam angle sensor SW9: Attached to the engine 100, and measuring a rotation angle of the exhaust cam shaft.

The ECU 10 determines the operating state of the engine 100 based on the signals of the sensors SW1-SW9, and calculates a controlled variable of each device according to the control logic defined beforehand. The control logic is stored in the memory 102, and includes calculating a targeted amount and/or a controlled variable by using a map stored in the memory 102.

The ECU 10 outputs the electric signals according to the calculated controlled variables to the injector 6, the spark plug 25, the intake S-VT 23, the exhaust S-VT 24, the fuel supply system 61, the throttle valve 43, and the EGR valve 54.

The engine 100 is also provided with a starter 7, which is coupled to the crankshaft 15 of the engine 100. The starter 7 is an electric motor. When a driver turns on an ignition switch, the ECU 10 outputs an electric signal to the starter 7. When the starter 7 is turned on, it rotates the crankshaft 15. Then, motoring of the engine 100 is started. After the motoring is started, the ECU 10 outputs the electric signals to the injector 6 and the spark plug 25 to finish startup of the engine 100.

(Determination of Fuel Property)

The property of the fuel supplied to the fuel tank 63 is not always the same. The property of the fuel supplied to the fuel tank 63 may change greatly compared with a standard fuel.

The memory 102 of the ECU 10 stores a map which is set based on the property of the standard fuel, and the ECU 10 controls the engine 100 by using the map based on the standard fuel. If the property of the fuel supplied to the engine 100 changes from the property of the standard fuel, it may cause misfire or rapid combustion.

Thus, this engine system 1 determines the property of the fuel supplied to the engine 100. Further, the engine system 1 corrects the controlled variables of the engine 100 according to the determined property of the fuel.

First, a method of determining the fuel property is described with reference to the drawings. The ECU 10 determines the fuel property during the motoring of the engine 100. The motoring of the engine 100 is a state where the starter 7 is rotating the crankshaft 15, and the high-temperature oxidation reaction does not occur inside the cylinder 11. During the motoring of the engine 100, since heat is not generated by the reaction of fuel inside the cylinder 11 and residual combustion gas is not produced, the ECU 10 can determine the property of fuel, without receiving these influences. Therefore, the determination accuracy is improved.

Figure 3:
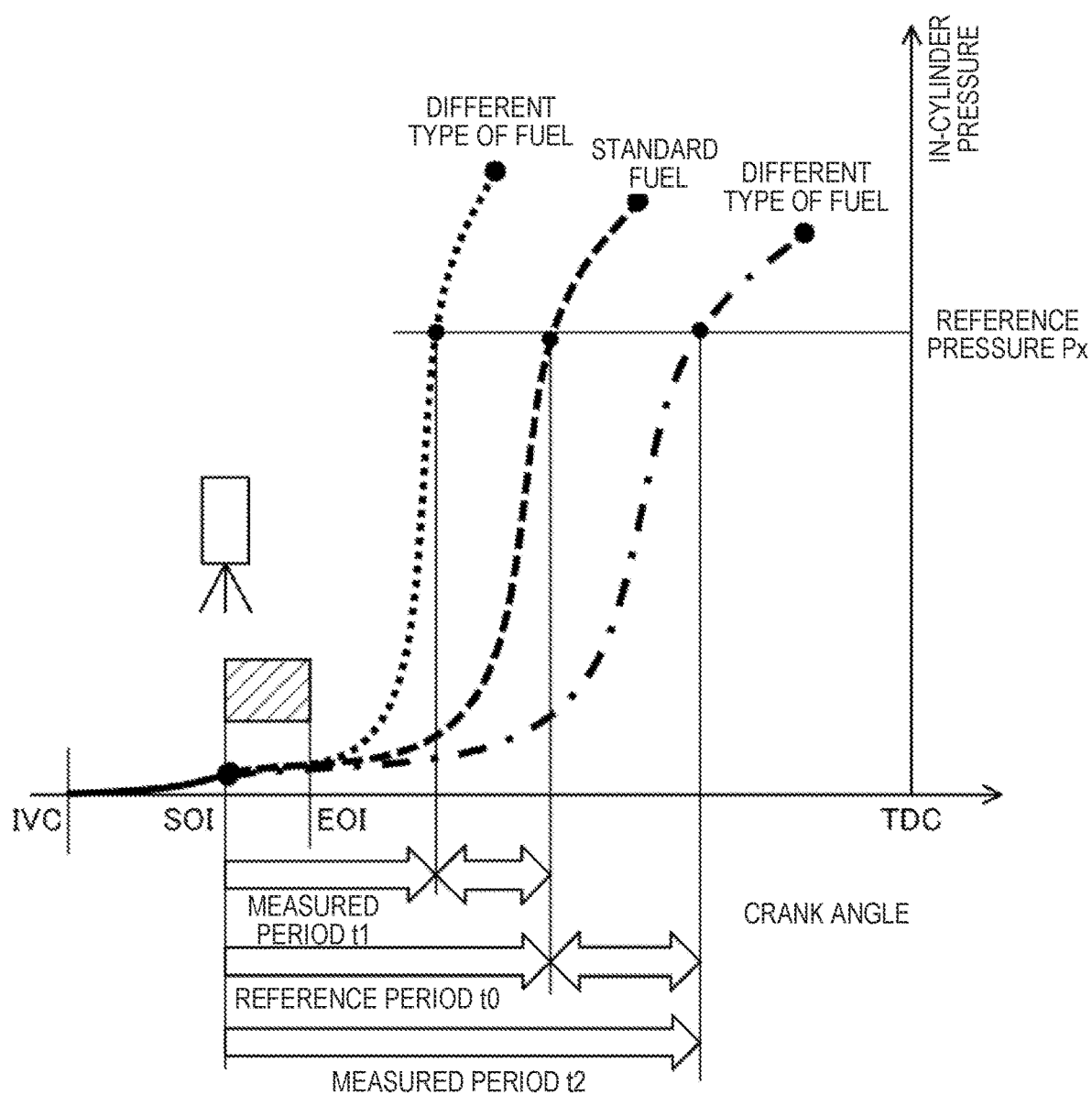
FIG. 3 illustrates a difference in a pressure change inside a cylinder when injecting a plurality of kinds of fuel with different properties.

FIG. 3 illustrates a change of the pressure inside a certain cylinder 11 during the motoring of the engine 100. In FIG. 3, the horizontal axis indicates a progress of the crank angle, and the vertical axis indicates a pressure inside the cylinder 11. As illustrated by a solid line, after the intake valve 21 is closed (i.e., IVC), the pressure inside the cylinder 11 starts to increase as the piston 3 moves upward.

The ECU 10 causes the injector 6 to inject fuel for analysis into the cylinder 11 at a specific timing after IVC. The cylinder 11 to which the fuel is injected may be the cylinder 11 whose intake valve 21 is closed first after the crankshaft 15 starts rotation.

As the cycle of the engine 100 progresses as the first cycle, the second cycle, and so on, the temperature inside the cylinder 11 increases gradually. When the temperature inside the cylinder 11 increases, the heat may affect the determination of the fuel property. By using the cylinder 11 whose intake valve 21 is closed first, the ECU 10 can determine the fuel property, without being influenced by the heat. The determination accuracy of the fuel property improves.

Here, the injector 6 may inject a small amount of fuel with which the high-temperature oxidation reaction does not occur, into the cylinder 11 as the fuel for analysis.

The fuel injected into the cylinder 11 results in the low-temperature oxidation reaction, through fission, atomization, evaporation, and mixing with air, according to the progress of time, inside the cylinder 11 where the pressure increases gradually with the ascent of the piston 3.

Here, when the molecular arrangement and/or the intermolecular force differ depending on the property of fuel (for example, the chemical structure of fuel), the chemical reaction speed also differs. That is, the speed of the initial chemical reaction in the preparatory step (for example, the in-cylinder gas temperature is 700K) of the low-temperature oxidation reaction differs depending on the chemical structure. The initial chemical reaction is a chemical reaction from occurrence of cold flame by a radical (alkylperoxy RO2, QOOHO2) generation due to the hydrogen abstraction reaction until chemical species, such as H, OH radical, bicarbonate (HCO), hydrogen peroxide ($H_2O_2$) and formaldehyde (HCHO), are generated by the progress of the low-temperature oxidation reaction. Therefore, if the speed of the initial chemical reaction differs, speeds of the temperature increase and the pressure increase inside the cylinder 11 differ. The difference in the chemical reaction speed changes a crank angle period from the start of fuel injection into the cylinder 11 to a timing of the pressure inside the cylinder 11 reaching a reference pressure. A dotted line in FIG. 3 illustrates a pressure increase when the standard fuel is injected into the cylinder 11. In case of the standard fuel, a reference period to is required from the injection start timing (SOI) of the fuel until the pressure inside the cylinder 11 reaching the reference pressure Px. The reference pressure Px is an example the "reference pressure" in the present disclosure.

The reference pressure Px corresponds to the pressure inside the cylinder 11 when the fuel injected into the cylinder 11 from the injector 6 achieves the low-temperature oxidation reaction through fission, atomization, evaporation, and mixing with air. The crank angle period until reaching the reference pressure Px becomes a period during which the chemical reaction speed of the fuel is reflected. Note that the reference pressure Px may be a pressure below a top dead center pressure when the piston 3 inside the cylinder 11 reaches a compression top dead center.

Contrary to the standard fuel, when a different type of fuel with a different property is injected into the cylinder 11, the crank angle period until the pressure inside the cylinder 11 reaches the reference pressure Px differs because the chemical reaction speed is different. A broken line in FIG. 3 illustrates the pressure increase when the different type of fuel of which the chemical reaction speed is quicker than the standard fuel is injected into the cylinder 11. Since this type of fuel has a short ignition delay time, the low-temperature oxidation reaction ends early and the pressure increase inside the cylinder 11 is stimulated. The crank angle period required for reaching the reference pressure Px (a measured period t1) is shorter than the crank angle period (i.e., the reference period t0) of the standard fuel. Further, a one-dot chain line in FIG. 3 illustrates the pressure increase when a different type of fuel of which the chemical reaction speed is slower than the standard fuel is injected into the cylinder 11. Since this type of fuel has a long ignition delay time, the low-temperature oxidation reaction becomes slow, and the pressure increase inside the cylinder 11 is suppressed. The crank angle period required for reaching the reference pressure Px (a measured period t2) is longer than the crank angle period of the standard fuel.

The memory 102 stores information on the property of the standard fuel. In more detail, the information is a crank angle period (i.e., the reference period t0) from the injection start timing when the standard fuel is injected into the cylinder 11 to a timing at which the pressure inside the cylinder 11 reaches the reference pressure (i.e., the reference pressure Px).

The ECU 10 acquires a crank angle period from the injector 6 starting the injection of the fuel for analysis to the pressure inside the cylinder 11 reaching the reference pressure Px, from the measurement signals of the in-cylinder pressure sensor SW4 and the crank angle sensor SW6, and compares a measured crank angle period t with the reference period to stored in the memory 102. If the measured crank angle period t matches with the reference period to, the ECU 10 can determine that the property of the fuel injected from the injector 6 matches with the property of the standard fuel. If the measured crank angle period t is shorter than the reference period to, the ECU 10 can determine that the fuel injected from the injector 6 is quicker in the chemical reaction speed than the standard fuel. If the measured crank angle period t is longer than the reference period t0, the ECU 10 can determine that the fuel injected from the injector 6 is slower in the chemical reaction speed than the standard fuel.

Here, the ECU 10 may determine the property of the fuel based on the crank angle period t measured in the cylinder 11 whose intake valve 21 is closed first since the crankshaft 15 started rotation. Further, the ECU 10 may measure the crank angle period t, not only in the cylinder 11 where the intake valve 21 is closed first but also in each of the plurality of cylinders 11 in which compression stroke takes place thereafter, and may determine the property of fuel based on an average value of the plurality of crank angle periods t. The ECU 10 may measure the crank angle period t for 4 to 5 cycles, for example.

When the crank angle period t is measured in each of the plurality of cylinders 11, since the piston speed increases as the cycle of the engine 100 during the motoring progresses, the temperature inside the cylinder 11 also increases. When the temperature inside the cylinder 11 increases, since the reaction speed of the fuel injected into the cylinder 11 changes, the crank angle period until reaching the reference pressure Px is influenced by the temperature change inside the cylinder 11.

Figure 4:
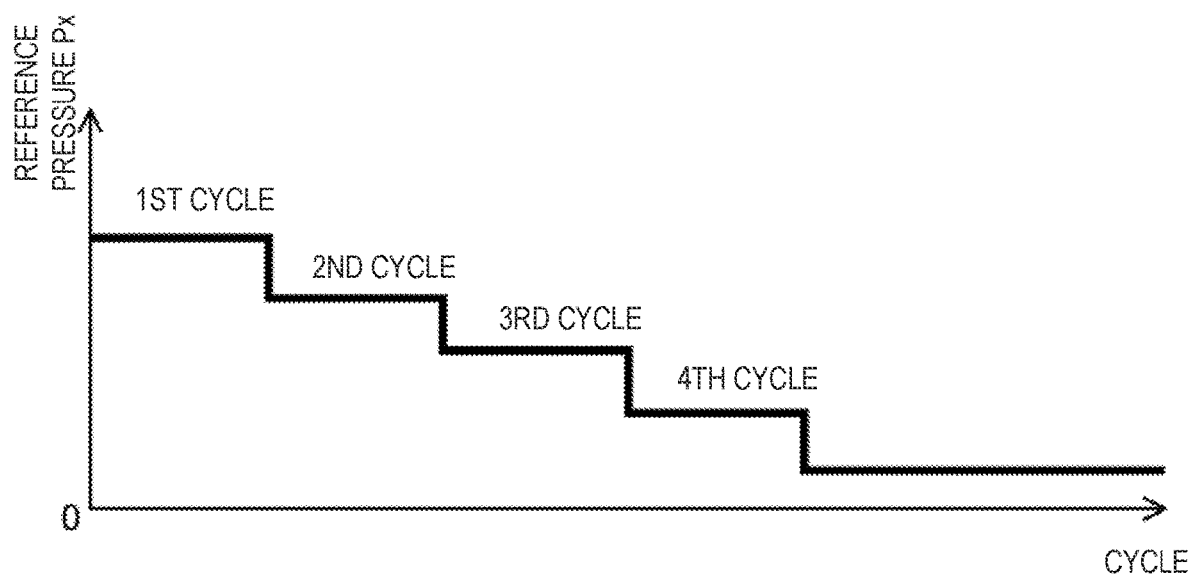
FIG. 4 illustrates a relationship between a progress of a cycle and a reference pressure.

Thus, the ECU 10 may change the reference pressure Px according to progress of the cycle of the engine 100. FIG. 4 illustrates a relationship between the progress of the cycle of the engine 100 and the reference pressure Px. The reference pressure Px decreases gradually as the cycle of the engine 100 progresses as the first cycle, the second cycle, the third cycle, and the fourth cycle. By doing so, the influence of the temperature inside the cylinder 11 gradually increasing can be eliminated, and therefore, the ECU 10 can determine the difference in the pressure increase inside the cylinder 11 only resulting from the fuel property.

(Control of Engine According to Fuel Property)

After the startup of the engine 100 is finished, the ECU 10 operates the engine 100, while correcting the injection amount of the fuel and/or the close timing of the intake valve 21 (IVC) according to the determined property of the fuel. Thus, even if the property of fuel differs, it can make the combustion equivalent to the combustion with the standard fuel, and therefore, it becomes advantageous for the improvement in fuel efficiency of the engine 100 and the improvement in emission gas performance. Further, the increase in combustion noise can be suppressed.

Figure 5:
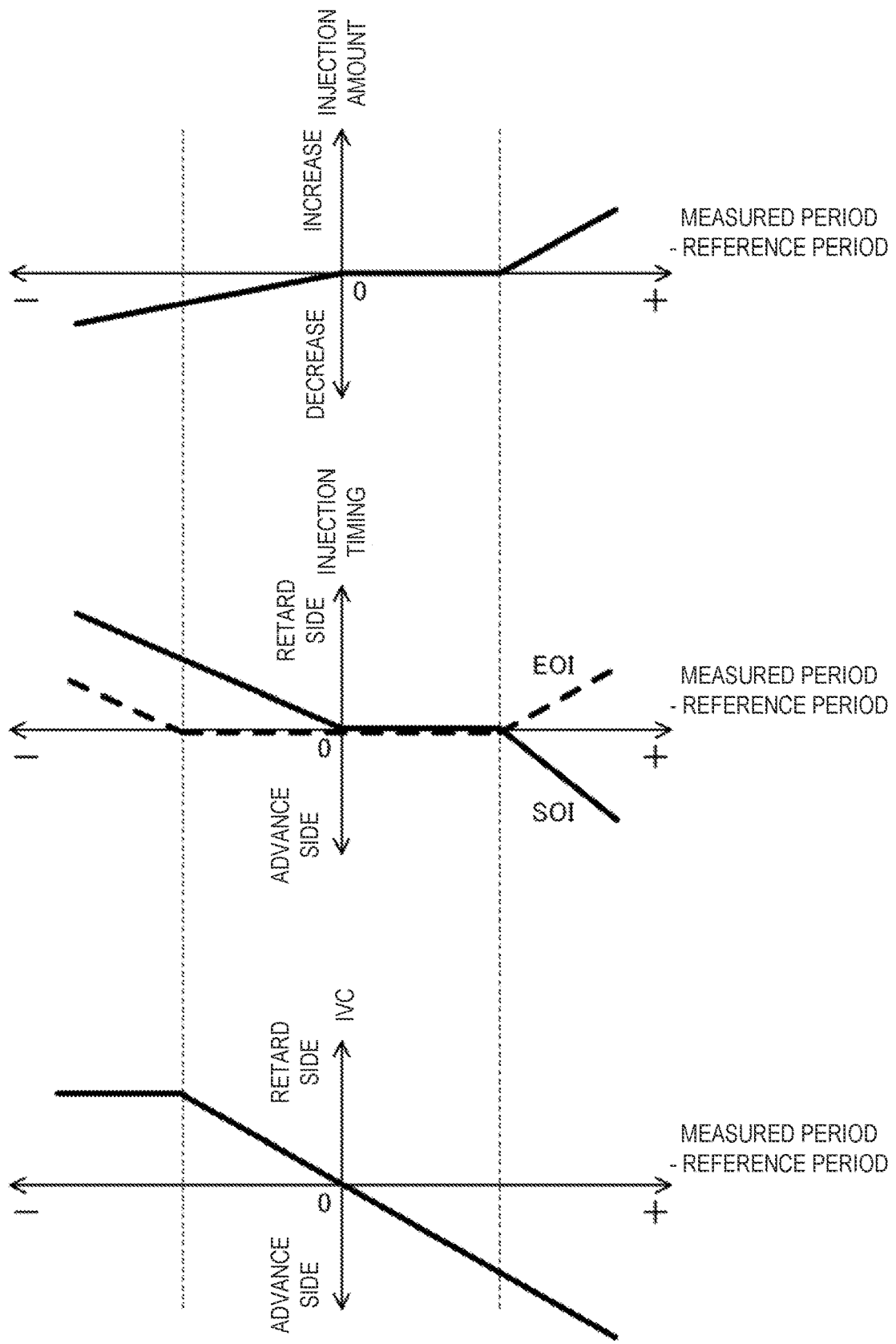
FIG. 5 illustrates a correction map of a fuel injection amount, a fuel injection timing, and a close timing of an intake valve.

FIG. 5 illustrates a correction map (upper figure) for the fuel injection amount, a correction map (middle figure) for the injection timing, and a correction map (lower figure) for the valve close timing. These correction maps are stored in the memory 102 of the ECU 10. In each correction map, the horizontal axis is a value of {measured period}-{reference period}, where the left side (i.e., negative) in this drawing indicates that the measured crank angle period t is shorter than the reference period to, and the right side (i.e., positive) in this drawing indicates that the measured crank angle period t is longer than the reference period to.

If the measured crank angle period t is shorter than the reference period to, the fuel is relatively quicker in the chemical reaction speed. Thus, as illustrated in the lower figure of FIG. 5, the ECU 10 corrects the close timing of the intake valve 21 to the retarding side through the intake S-VT 23. Since the temperature and the pressure inside the cylinder 11 drop when the close timing of the intake valve 21 is retarded, the chemical reaction with the fuel progresses less easily. Even if it is the fuel with a fast chemical reaction speed, this combustion becomes equivalent to the combustion with the standard fuel.

On the contrary, when the measured crank angle period t is longer than the reference period to, this fuel is relatively slow in the chemical reaction speed. Then, as illustrated in the lower figure of FIG. 5, the ECU 10 corrects the close timing of the intake valve 21 to the advancing side through the intake S-VT 23. Since the temperature and the pressure inside the cylinder 11 increase when the close timing of the intake valve 21 is advanced, the chemical reaction of the fuel progresses more easily. Even if it is the fuel with the slow chemical reaction speed, this combustion becomes equivalent to the combustion with the standard fuel. Note that the closing timing of the intake valve 21 is set after an intake bottom dead center.

In more detail, the control map of the lower figure of FIG. 5 is configured to correct the close timing of the intake valve 21 so that the close timing of the intake valve 21 is retarded as the measured crank angle period t becomes shorter than the reference period t0, and correct the close timing of the intake valve 21 so that the close timing of the intake valve 21 is advanced as the measured crank angle period t becomes longer than the reference period t0. Thus, the temperature and the pressure inside the cylinder 11 are adjusted to a temperature and a pressure according to the property of the fuel.

Here, there is a limit for the retard amount of the close timing of the intake valve 21, and since a blow back to the intake system is limited by the intake valve choke even if the close timing of the intake valve 21 is retarded exceeding a maximum retard amount, the temperature and the pressure inside the cylinder 11 cannot drop easily below the limit. Thus, when the valve close timing reaches the maximum retard amount in the control map illustrated in the lower figure of FIG. 5, the ECU 10 does not retard the close timing of the intake valve 21 any further.

Further, when the measured crank angle period t is shorter than the reference period t0, the ECU 10 corrects the injection start timing (SOI) of the fuel to the retarding side, as illustrated in the middle figure of FIG. 5. The injection start timing of the fuel is retarded as the crank angle period t becomes shorter than the reference period t. Therefore, as illustrated in the upper figure of FIG. 5, since the fuel injection amount becomes less and the concentration of the mixture gas becomes lower, the chemical reaction speed becomes slower and this combustion becomes equivalent to the combustion with the standard fuel.

As described above, when the close timing of the intake valve 21 reaches the maximum retard amount, the ECU 10 corrects each of the injection start timing (SOI) of the fuel and the injection end timing (EOI) to the retarding side. The injection start timing and the injection end timing of the fuel are retarded as the crank angle period t becomes shorter than the reference period t0. Thus, as illustrated in the upper figure of FIG. 5, the fuel injection amount becomes less as the crank angle period t becomes shorter than the reference period t0. When the drop of the temperature and the pressure inside the cylinder 11 cannot be expected, since the concentration of the mixture gas becomes lower as the fuel injection amount becomes less, the chemical reaction speed becomes slower and the combustion becomes equivalent to the combustion with the standard fuel.

When the measured crank angle period t is longer than the reference period t0 and the difference between the measured crank angle period t and the reference period t0 is more than a given value, the ECU 10 corrects the injection start timing (SOI) of the fuel to the advancing side and corrects the injection end timing (EOI) to the retarding side, as illustrated in the middle figure of FIG. 5. The injection start timing of the fuel is advanced and the injection end timing is retarded as the crank angle period t becomes longer than the reference period t0. Thus, as illustrated in the upper figure of FIG. 5, the fuel injection amount increases as the crank angle period t becomes longer than the reference period t0. Since the concentration of the mixture gas increases, the chemical reaction is stimulated and the combustion becomes equivalent to the combustion with the standard fuel.

(Control Flow)

Figure 6:
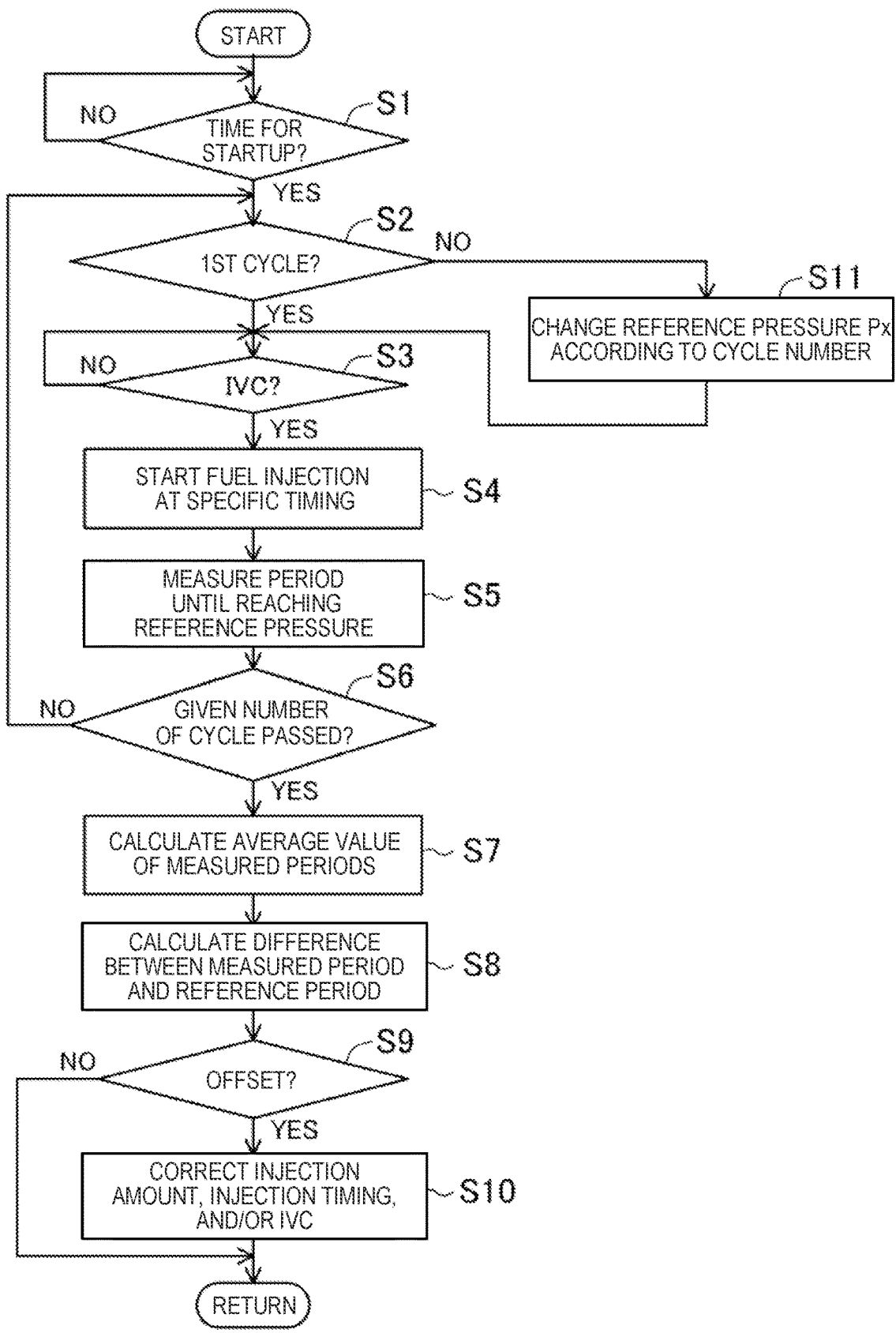
FIG. 6 illustrates a control flow of the engine system executed by a controller.

Next, a procedure of the control executed by the ECU 10 is described with reference to a flow of FIG. 6. First, after the start, at Step S1, the ECU 10 determines whether it is time for starting the engine 100. If not the time for a startup, the process repeats Step S1, and if it is the time for a startup, the process shifts to Step S2.

At Step S2, the ECU 10 determines whether the number of cycle is the first cycle since the crankshaft 15 started rotation. If it is the first cycle, the process shifts to Step S3, and if it is the second or subsequent cycle, the process shifts to Step S11.

At Step S3, the ECU 10 determines whether the intake valve 21 is closed in the cylinder 11 which is a target for injecting the fuel for analysis. Note that, if the number of cycle is the first cycle, it is the intake valve 21 which is first closed after the crankshaft 15 started rotation. If the determination at Step S3 is NO, the process repeats Step S3, and if the determination at Step S3 is YES, the process shifts to Step S4.

At Step S4, the ECU 10 causes the injector 6 to start injecting the fuel for analysis at a specific timing after the intake valve 21 is closed, at the subsequent Step S5, the ECU 10 acquires the crank angle period t, from the start timing of the fuel injection until the pressure inside the cylinder 11 reaching the reference pressure Px, based on the measurement signals of the in-cylinder pressure sensor SW4 and the crank angle sensor SW6.

At Step S6, the ECU 10 determines whether a given number of cycles has passed since the motoring of the engine 100 was started. This given number of cycles is the number of cycles for performing the measurement of the crank angle period, and it may be 4 to 5 cycles, for example. If the determination at Step S6 is NO, the process returns to Step S2.

At Step S2, if it is the second or subsequent cycle, the process shifts to Step S11. After the ECU 10 changed the reference pressure Px according to the map in FIG. 4, the ECU 10 performs Steps S3-S5. In this way, the fuel injection into the cylinder 11 and the measurement of the crank angle period are repeated a plurality of times.

If the determination at Step S6 becomes YES, the process shifts to Step S7. The ECU 10 calculates an average value of the plurality of measured crank angle periods, and at the subsequent Step S8, it calculates a difference between the measured crank angle period and the reference period of the standard fuel. Further, at Step S9, the ECU 10 determines whether there is an offset between the measured crank angle period and the reference period, and if there is an offset, the process shifts to Step S10. At Step S10, according to the control map in FIG. 5, the ECU 10 corrects the fuel injection amount, the start timing of the fuel injection, and/or the close timing of the intake valve 21 after the startup of the engine 100 is finished, based on the fuel property. On the other hand, if there is no offset, the ECU 10 does not correct the fuel injection amount, the start timing of the fuel injection, and the close timing of the intake valve 21.

According to the method of controlling the engine 100 and the engine system 1 disclosed herein, the ECU 10 can determine the fuel property with sufficient accuracy because the fuel for analysis is injected into the cylinder 11 in compression stroke, during motoring of the engine 100.

Further, since the combustion under operation of the engine 100 becomes equivalent to the combustion with the standard fuel by correcting the controlled variables of the engine 100 according to the determined property of the fuel, the improvement in fuel efficiency and the improvement in emission gas performance are achieved. In addition, the increase in combustion noise can be suppressed.

Note that the technique disclosed herein is not limited to being applied to the engine system 1 having the configuration described above. The technique disclosed herein is applicable to engine systems 1 of various configurations. For example, the technique disclosed herein is also applied to diesel engines.

Further, the technique disclosed herein is also applicable to so-called "hybrid vehicles." In this case, the engine motoring may be performed by a generator. Further, in the hybrid vehicle, an engine may be started in response to a power generation demand or a torque demand. The ECU 10 may determine the fuel property, when the engine is started, according to the power generation demand or the torque demand.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine System
10 ECU (Controller)
100 Engine
11 Cylinder
15 Crankshaft
21 Intake Valve
6 Injector
SW4 In-cylinder Pressure Sensor
SW6 Crank Angle Sensor

What is claimed is:

1. A method of controlling an engine, comprising the steps of:
    during motoring of the engine, injecting, by an injector, fuel for analysis into a cylinder of the engine at a specific timing after an intake valve of the cylinder is closed;
    acquiring, by a controller, a crank angle period from a start timing of the fuel injection to a timing of a pressure inside the cylinder reaching a reference pressure, in response to signals of a crank angle sensor and an in-cylinder pressure sensor; and
    determining, by the controller, a property of the fuel injected by the injector by comparing the acquired crank angle period with a reference crank angle period, the reference crank angle period being from an injection start timing when a standard fuel is injected into the cylinder to a timing of the pressure inside the cylinder reaching the reference pressure, wherein
    the cylinder is one of a plurality of cylinders,
    the cylinder into which the injector injects the fuel for analysis is the cylinder, out of the plurality of cylinders, whose intake valve is closed first after a crankshaft of the engine starts rotation,
    for each of the plurality of cylinders, the injector injects the fuel for analysis as a cycle of the engine progresses,
    the controller acquires the crank angle period for each of the plurality of cylinders,
    the controller compares an average value of the acquired plurality of crank angle periods with the reference crank angle period to determine the property, and
    the reference pressure becomes lower as the cycle of the engine progresses.

2. The method of claim 1, wherein the reference pressure corresponds to a pressure inside the cylinder at a timing of the fuel injected into the cylinder from the injector achieving a combustion reaction at an in-cylinder temperature of 750K or lower.

3. The method of claim 2, wherein the controller corrects at least one of a fuel injection amount, a fuel injection timing, and a close timing of the intake valve according to the property of the fuel, after startup of the engine is finished.

4. The method of claim 3, wherein when the acquired crank angle period is longer than the reference crank angle period, the controller corrects the close timing of the intake valve to an advancing side, and when the acquired crank angle period is shorter than the reference crank angle period, the controller corrects the close timing of the intake valve to a retarding side.

5. The method of claim 4, wherein the controller corrects the close timing of the intake valve so that the close timing of the intake valve is advanced when the acquired crank angle period is longer than the reference crank angle period, and when the acquired crank angle period is longer than the reference crank angle period by a given value or more, the controller increases the fuel injection amount by correcting the start timing of the fuel injection to the advancing side and correcting an end timing of the fuel injection to the retarding side.

6. The method of claim 5, wherein the controller reduces the fuel injection amount by correcting the close timing of the intake valve so that the close timing of the intake valve is retarded when the acquired crank angle period is shorter than the reference crank angle period.

7. The method of claim 6, wherein when the valve close timing reaches a maximum retard amount, the controller reduces the fuel injection amount by correcting the fuel injection start timing to the retarding side and correcting the end timing of the fuel injection to the retarding side when the acquired crank angle period is shorter than the reference crank angle period.

8. The method of claim 1, wherein the controller corrects at least one of a fuel injection amount, a fuel injection timing, and a close timing of the intake valve according to the property of the fuel, after startup of the engine is finished.

9. The method of claim 8, wherein when the acquired crank angle period is longer than the reference crank angle period, the controller corrects the close timing of the intake valve to an advancing side, and when the acquired crank angle period is shorter than the reference crank angle period, the controller corrects the close timing of the intake valve to a retarding side.

10. A method of controlling an engine, comprising the steps of:
    during motoring of the engine, injecting, by an injector, fuel for analysis into a cylinder of the engine at a specific timing after an intake valve of the cylinder is closed;
    acquiring, by a controller, a crank angle period from a start timing of the fuel injection to a timing of a pressure inside the cylinder reaching a reference pressure, in response to signals of a crank angle sensor and an in-cylinder pressure sensor; and
    determining, by the controller, a property of the fuel injected by the injector by comparing the acquired crank angle period with a reference crank angle period, the reference crank angle period being from an injection start timing when a standard fuel is injected into the cylinder to a timing of the pressure inside the cylinder reaching the reference pressure, wherein the controller corrects at least one of a fuel injection amount, a fuel injection timing, and a close timing of the intake valve according to the property of the fuel, after startup of the engine is finished, when the acquired crank angle period is longer than the reference crank angle period, the controller corrects the close timing of the intake valve to an advancing side, and when the acquired crank angle period is shorter than the reference crank angle period, the controller corrects the close timing of the intake valve to a retarding side, and the controller corrects the close timing of the intake valve so that the close timing of the intake valve is advanced when the acquired crank angle period is longer than the reference crank angle period, and when the acquired crank angle period is longer than the reference crank angle period by a given value or more, the controller increases the fuel injection amount by correcting the start timing of the fuel injection to the advancing side and correcting an end timing of the fuel injection to the retarding side.

11. The method of claim 10, wherein the controller reduces the fuel injection amount by correcting the close timing of the intake valve so that the close timing of the intake valve is retarded when the acquired crank angle period is shorter than the reference crank angle period.

12. The method of claim 11, wherein, when the valve close timing reaches a maximum retard amount, the controller reduces the fuel injection amount by correcting the fuel injection start timing to the retarding side and correcting the end timing of the fuel injection to the retarding side when the acquired crank angle period is shorter than the reference crank angle period.

13. A method of controlling an engine, comprising the steps of:

during motoring of the engine, injecting, by an injector, fuel for analysis into a cylinder of the engine at a specific timing after an intake valve of the cylinder is closed;

acquiring, by a controller, a crank angle period from a start timing of the fuel injection to a timing of a pressure inside the cylinder reaching a reference pressure, in response to signals of a crank angle sensor and an in-cylinder pressure sensor; and determining, by the controller, a property of the fuel injected by the injector by comparing the acquired crank angle period with a reference crank angle period, the reference crank angle period being from an injection start timing when a standard fuel is injected into the cylinder to a timing of the pressure inside the cylinder reaching the reference pressure, wherein the controller corrects at least one of a fuel injection amount, a fuel injection timing, and a close timing of the intake valve according to the property of the fuel, after startup of the engine is finished, when the acquired crank angle period is longer than the reference crank angle period, the controller corrects the close timing of the intake valve to an advancing side, and when the acquired crank angle period is shorter than the reference crank angle period, the controller corrects the close timing of the intake valve to a retarding side, and the controller reduces the fuel injection amount by correcting the close timing of the intake valve so that the close timing of the intake valve is retarded when the acquired crank angle period is shorter than the reference crank angle period.

14. The method of claim 13, wherein, when the valve close timing reaches a maximum retard amount, the controller reduces the fuel injection amount by correcting the fuel injection start timing to the retarding side and correcting an end timing of the fuel injection to the retarding side when the acquired crank angle period is shorter than the reference crank angle period.

* * * * *